Aug. 29, 1939.     H. V. HARDING     2,171,365
AUTOMATIC HOLDING AND RELEASING DEVICE
Filed Sept. 3, 1937      4 Sheets-Sheet 1
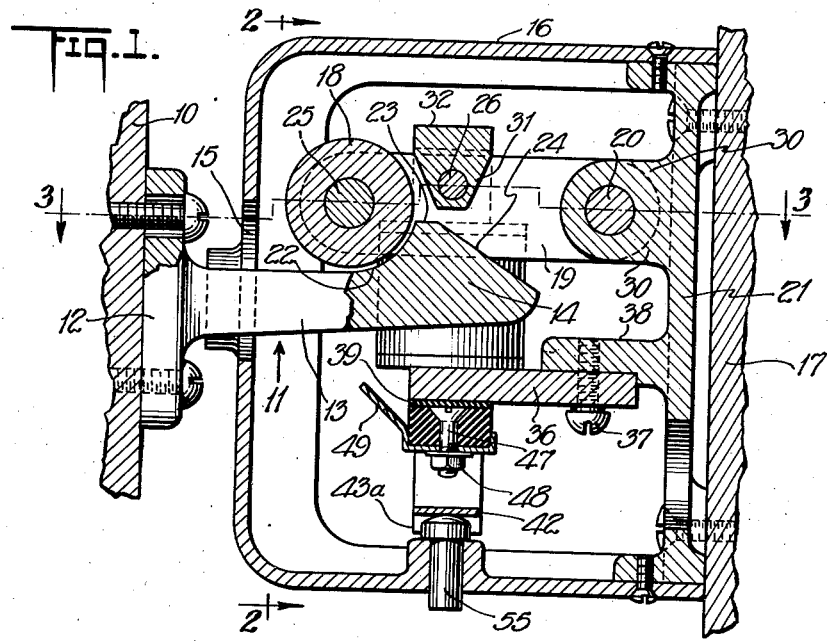
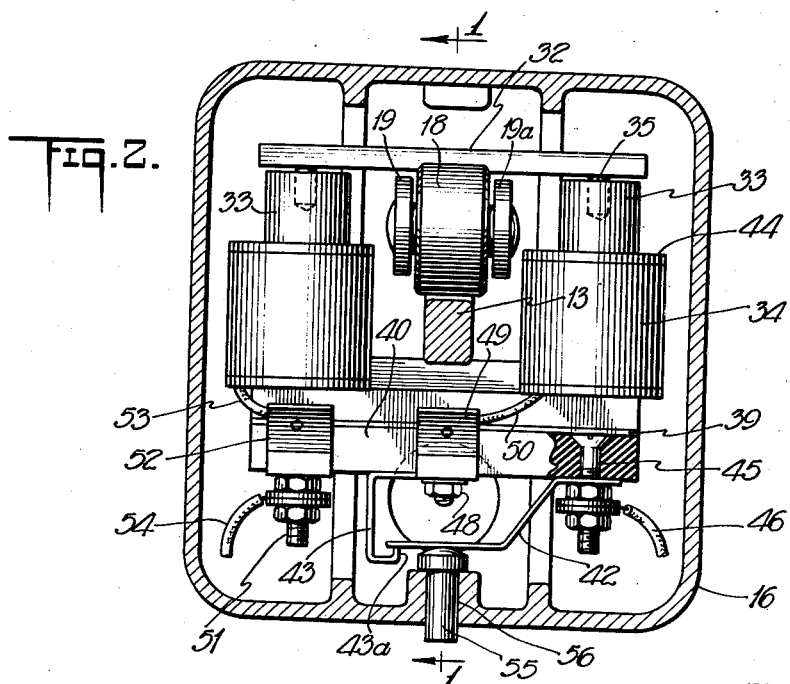
INVENTOR
Howard V. Harding
BY
Franklin J. Foster
ATTORNEYS Aug. 29, 1939.  H. V. HARDING  2,171,365
AUTOMATIC HOLDING AND RELEASING DEVICE
Filed Sept. 3, 1937  4 Sheets-Sheet 2
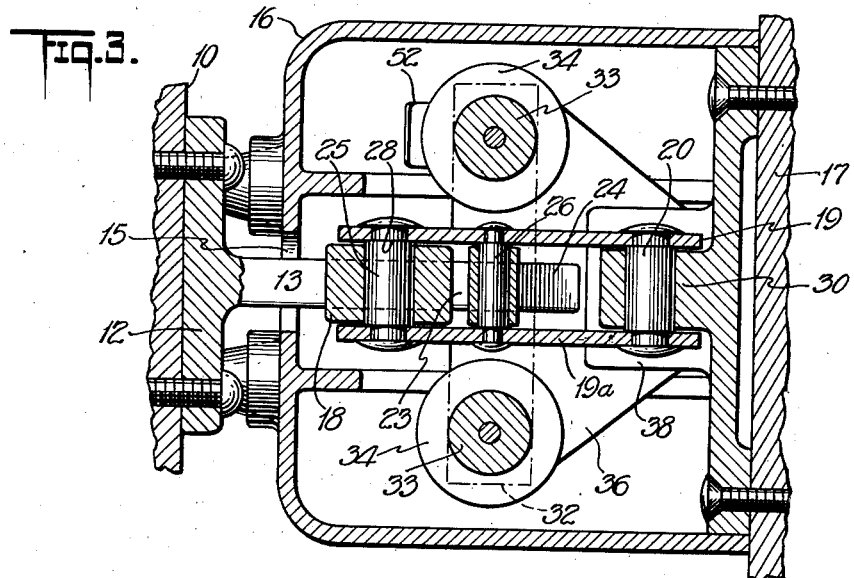
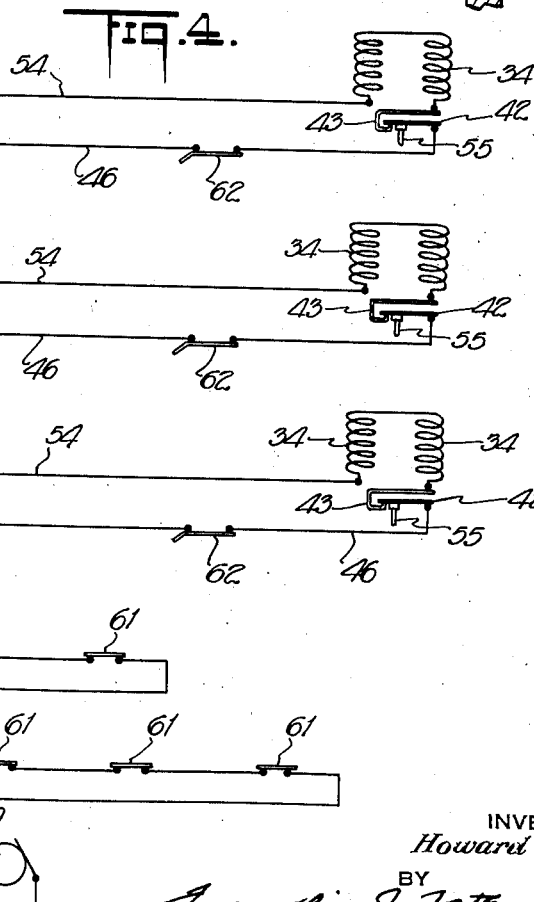
INVENTOR
*Howard V. Harding*
BY
*Franklin J. Foster*
ATTORNEYS Aug. 29, 1939. H. V. HARDING 2,171,365
AUTOMATIC HOLDING AND RELEASING DEVICE
Filed Sept. 3, 1937 4 Sheets-Sheet 3

Howard V. Harding.
INVENTOR.

BY Franklin J. Foster
ATTORNEY.

Aug. 29, 1939.   H. V. HARDING   2,171,365
AUTOMATIC HOLDING AND RELEASING DEVICE
Filed Sept. 3, 1937   4 Sheets-Sheet 4

Howard V. Harding,
INVENTOR.

BY Franklin J. Foster
ATTORNEY.

Patented Aug. 29, 1939

2,171,365

UNITED STATES PATENT OFFICE 2,171,365

AUTOMATIC HOLDING AND RELEASING DEVICE

Howard V. Harding, New York, N. Y.

Application September 3, 1937, Serial No. 162,305

14 Claims. (Cl. 292—201)

My present invention is concerned with automatic holding and release mechanism for closures. While it is primarily designed for use on shipboard to effect the automatic holding and release of hatches, fire doors, ventilator gates or the like it is capable of general utility in connection with any type of apparatus where the automatic release of a closure member is to be effected in an emergency.

A feature of the invention is the provision of a device of this character which is not dependent upon an available supply of electrical energy in the event of an emergency. It is of the type in which the closure is held in open or closed position by an electromagnet and automatically released upon failure of current through the magnet coils.

The advantages of this arrangement are more or less obvious since the very emergency which may require the automatic opening or closing of the fire doors or the like is very apt to cause failure of electric current. With the device of my invention, failure of current causes operation of the automatic releasing devices. In other words any failure of current whether by accident or by design effects the desired releasing operation.

While the devices may be controlled in groups or singly by thermostatic or other automatic switches they are equipped with manual switches so that the circuit through the magnet coil may be conveniently broken for testing purposes at any time. This is of importance particularly on shipboard where regular tests and inspection of the safety equipment must be made and where it is undesirable to alarm the passengers by group operation of the safety releases.

The holding and release mechanism is of sturdy, rugged, durable construction, simple and positive in operation and well adapted to meet the requirements of economic manufacture and convenient assembly.

The holding and release units are also of a compact nature requiring very little space in which to mount them.

The invention may be more fully understood from the following description in connection with the accompanying drawings wherein:

Fig. 1 is a vertical sectional view through one of the automatic holding and releasing units showing the unit mounted on a stationary support and engaging the bolt of a door or other closure, Fig. 2 is a vertical sectional view on the line 2—2 of Fig. 1, Fig. 3 is a sectional plan view taken approximately on the staggered line 3—3 of Fig. 2, and Fig. 4 is a typical wiring diagram.

Figure 5:
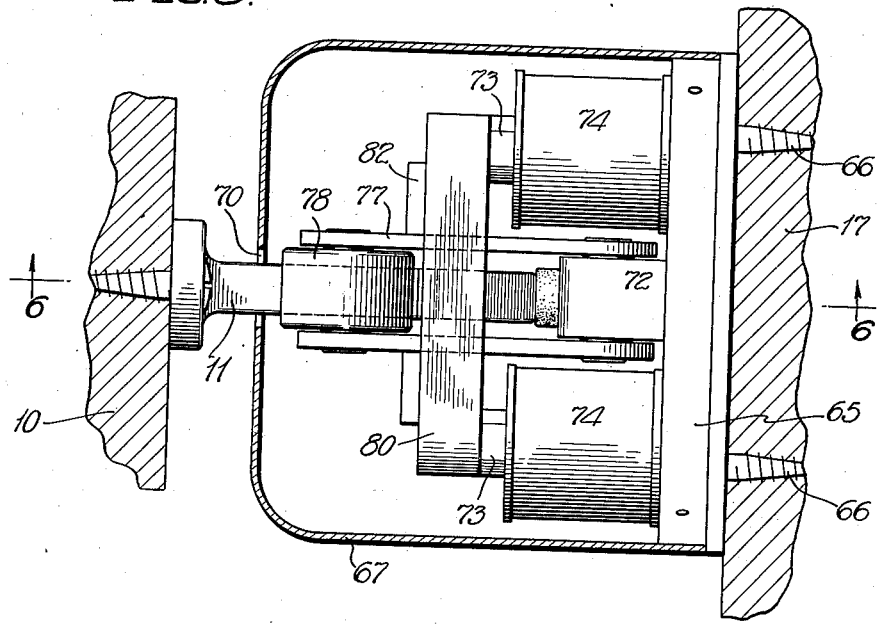
Fig. 5 is a plan view of a modified form of the invention with part of the housing for the magnetic keeper broken away and in section.

Referring with more particularity to the drawings I have used the reference character 10 to designate a closure which may be a door, a hatch, or any analogous element adapted to be releasably held in open position and to be released automatically under emergency conditions, such as fire.

Rigidly fixed to the door 10 is a bolt indicated generally at 11 comprising a base portion 12 screwed or otherwise secured to the door, a reduced shank portion 13 and an enlarged head portion 14.

The shank of the bolt projects through an opening 15 in a box 16 screwed or otherwise suitably secured to a bulk head or other fixed supporting element 17. The box 16 houses the keeper mechanism and automatic release mechanism for the bolt.

The magnetic keeper for the bolt consists of a roller 18 journaled in the outer end of the lever 19, the opposite end of the lever having a pivotal connection at 20 with the anchoring plate 21 of the box 16. The bolt head 14 is provided with an upwardly facing arcuate cam surface 22, following the curvature of the periphery of the roller 18. Beyond the arcuate surface 22 the upper surface of the bolt is provided with a narrow flat surface 23 and from the surface 23 the upper face of the bolt inclines downwardly providing a cam surface 24 which serves to elevate the roller 18 as the bolt is thrust through the opening 15 into the box 16. The roller is normally magnetically held in the position of Fig. 1. Upon failure of an energizing current for the magnet the weight of the door 10 effects automatic release, the roller riding over the surfaces 23 and 24 as the bolt is withdrawn from the keeper mechanism. On the return of the door to latched position the cam surface 24 elevates the roller 18 to permit passage of the bolt head thereunder.

The lever which I have designated generally at 19 preferably includes a pair of spaced parallel bars. These bars are rigidly connected by three rivets 25, 26 and 20. The rivets are shouldered as at 28 to properly space the two bars apart.

The intermediate portion of the rivet 25 serves as a journal for the roller 18. The intermediate portion of the rivet 20 affords the pivotal connection between the end of the levers 19 and a boss 30 integral with the casing 16 and having an opening therein to receive the rivet.

The third rivet 26 which is disposed between the other two passes through a depending lug 31 integral with a transverse armature bar 32 of paramagnetic material. The ends of this bar are drawn against the pole pieces 33 of the magnet when the magnet coils 34 are energized.

Pins 35 at the ends of the pole pieces 33 are of non-magnetic material and project slightly above the pole faces, preventing complete magnetic control between pole faces and bar 32 to minimize the effects of residual magnetism when coils 34 are de-energized. An alternative method is the copper plating of the pole faces, the thin layer of deposited copper serving to prevent complete magnetic control.

The magnet yoke is completed by a plate 36 from which the pole pieces rise and which is secured by a screw 37 or other suitable means to a lug 38 integral with the anchor plate 21.

Supported under the plate 36 and spaced therefrom by an interposed insulating strip 39 is an insulating block 40 which mounts the manual testing switch which I shall later describe. The purpose of the strip 39 is to prevent contact between the plate 36 and certain securing bolts which pass through the insulating block and serve as binding posts or mounting means for the complementary contact elements 42, 43 of the testing switch. It will be understood, of course, that the magnetic coils are mounted on the conventional insulating spools 44 to prevent their contact with the magnetic yoke.

A binding post 45 passing through the block 40 is attached to a lead wire 46 connected to any suitable source of electrical energy such as the generator 60 of Fig. 4. This post likewise secures in place upon the under side of the block 40, the spring element 42 of the testing switch, typically a spring metal strip having its two ends disposed in approximately parallel planes and integrally connected by the inclined intermediate portion of the strip. One strip end is held flat against the under face of the block 40 by a nut on the binding post. The other strip end tends to swing downwardly by its own inherent resiliency against the upwardly hooked lower end 43a of the complementary stationary switch element 43. This latter element is secured in position by a bolt 47 extending through block 40. A nut 48 on the end of this bolt supports a soldering clip or other terminal connector 49 to which one end of a lead wire 50 to one magnet coil is secured.

A binding post 51 similar to post 45 passes through the block 40 and likewise carries a terminal connector 52 which is connected to the other magnet coil by a lead wire 53. Another lead 54 from the post 51 completes the circuit and the coils themselves are series connected.

A push button 55 working in an opening 56 in the bottom of the casing may be thrust manually upwardly to open the testing switch 42, 43.

The operation of the device will be evident from the foregoing description. The bar 32 being normally held against the pole pieces of the magnet normally maintains the roller in position to serve as an effective keeper for the bolt. When the magnet is deenergized the closure member is free to move by its own momentum or by the influence of a spring or counter weight to its desired emergency position.

The method of wiring several of these automatic release units for individual or group operation as shown in Fig. 4 is merely typical. Various wiring methods may be employed in accordance with the particular use to which the release devices are to be put.

In Fig. 4 the magnet coils of several units are connected in parallel with the two main wires 63 of a circuit energized by a generator 60. Group operation of all of the release devices may be effected by throwing any of a series of master switches 61 or individual emergency operation of single release units may be effected by thermostatic switches 62.

Figure 6:
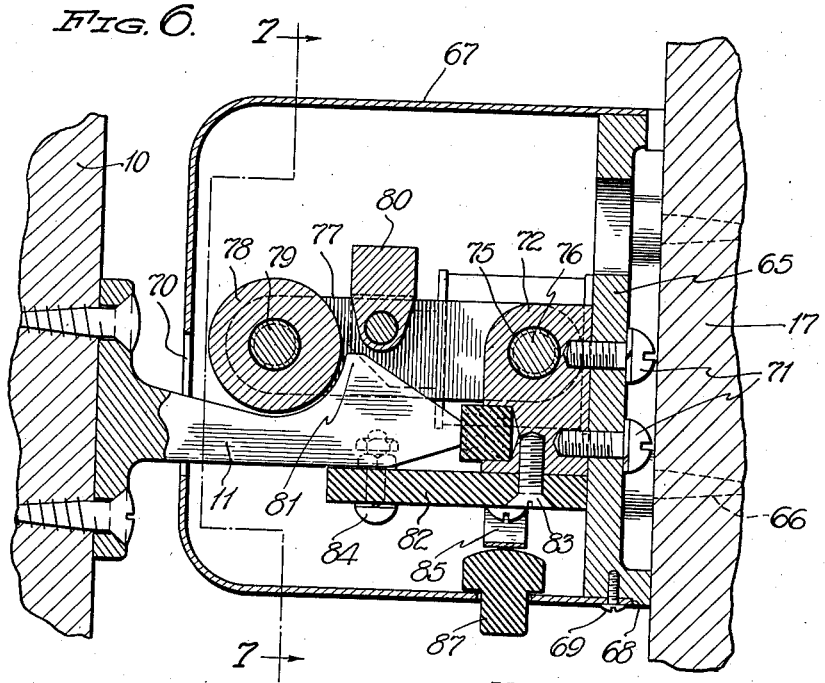
Fig. 6 is a vertical sectional view on the line 6—6 of Fig. 5.
Figure 7:
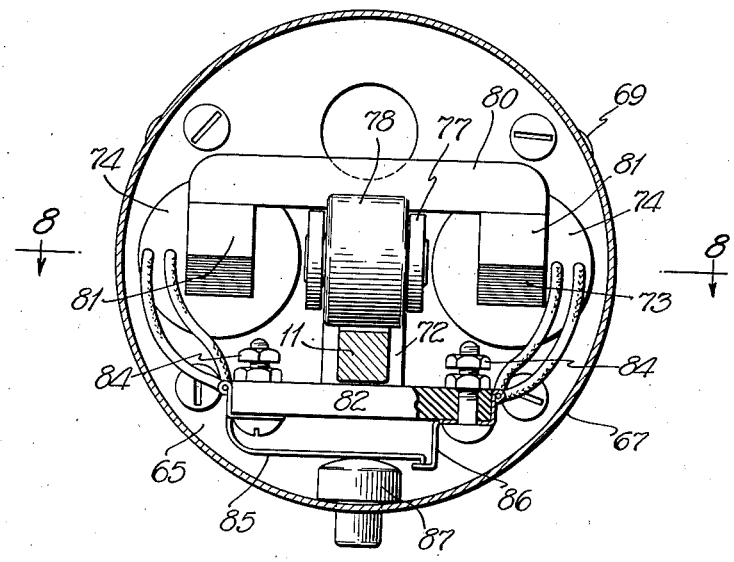
Fig. 7 is a vertical sectional view on the staggered line 7—7 of Fig. 6.
Figure 8:
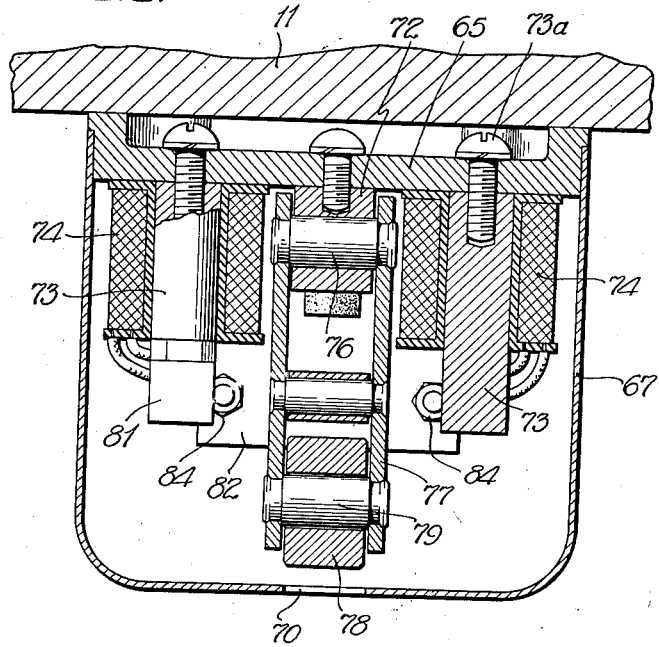
Fig. 8 is a horizontal sectional view on the line 8—8 of Fig. 7.

In Figs. 5 to 8 inclusive I have illustrated an alternative type of construction which is somewhat simplified and somewhat less expensive to manufacture than the device illustrated in Figs. 1 to 3 inclusive.

The device of Figs. 5 to 8 inclusive operates on the same principle as the device previously described and a series of this type of release units may conveniently be wired in accordance with the wiring diagram illustrated in Fig. 4.

Referring with more particularity to the drawings 65 represents a circular anchoring plate which may be screwed or otherwise secured as at 66 to the bulk head 17. A cup-like shell 67 has its open end fitted over the plate 65 and abutting an external shoulder 68 on the plate, the shell being secured to the plate by screws 69 or equivalent securing devices. The plate and the shell cooperatively providing a housing for the magnetic keeper mechanism and the shell has an opening 70 therein to admit the bolt 11 carried by the closure 10.

Secured as by screws 71 to the inner face of the plate 65 is a block 72. Projecting from the plate 65 at opposite sides of the block 72 are magnet cores 73, the latter being screwed or otherwise secured as at 73a to the plate 65, this plate forming part of the magnet yoke. The cores 73 which are horizontally disposed are encircled by the magnet coils 74, the latter being series connected in any conventional manner (not shown).

The upper end of the block 72 has a transverse circular bore 75 therethrough receiving the pivot pin 76 for the roller carrying lever 77 which lever is in all material respects similar to that illustrated in Fig. 1. The roller 78 is journalled on a pin 79 near the free end of the lever and a magnetic bar 80 corresponding to the bar 32 is mounted in corresponding fashion at the intermediate portion of the lever 77.

The magnet cores 73 have upturned outer ends 81 presenting upwardly facing flat pole pieces to be bridged by the bar 80 when the bar is magnetically drawn down to latch the bolt 11 in place by the roller 78. In this case no pins 35 are used but the pole faces are preferably copper plated to prevent any tendency of the bridging bar 80 to stick against pole faces because of residual magnetism.

With this form of the invention I have simplified the means for supporting the various electrical connections and the testing switch. All of these devices are mounted upon a flat plate 82 of insulating material screwed or otherwise secured at 83 to the under face of the block 72. This plate carries terminal connections 84 for the various lead wires to the magnet and to the main supply lines, Pendant from the plate is the two part testing switch 85, 86 adapted to be opened by a push button 87 working through the bottom of the shell 67. The operation of this form of the device being in all respects similar to the form of release mechanism illustrated in Figs. 1 to 4 inclusive, no detailed description of operation is believed necessary.

It will be obvious that many changes and alterations might be made in the structural details above described without departing from my invention and I therefore do not wish to limit myself to the specific arrangement of parts described but consider myself at liberty to make all changes and variations which fairly fall within the spirit and scope of the appended claims.

I claim:

1. An automatic holding and release mechanism for closures including a pivoted member, an electromagnet, an armature carried by said pivoted member and cooperating with said magnet for normally retaining said member in a predetermined position, a roller carried by said member at a section spaced from the pivotal support of said member, and a closure retaining bolt including a cam portion normally engaged and held by said roller and capable of displacing said roller to permit movement of the closure upon failure of current through the electromagnet.

2. An automatic holding and release mechanism for closures including a pivoted member, an electromagnet, an armature carried by said pivoted member and cooperating with said magnet for normally retaining said member in a predetermined position, a roller carried by said member at a section spaced from the pivotal support of said member, and a closure retaining bolt including a portion normally engaged and held by said roller and capable of displacing said roller to permit movement of the closure upon failure of current through the electromagnet, that portion of the bolt which is held by the roller comprising a bolt head having a curved cam face following the curvature of the roller periphery, said bolt head likewise having a second cam face adapted to displace the roller as the bolt head moves into latched position.

3. An automatic holding and release mechanism including a housing, an electromagnet mounted within the housing including a yoke portion presenting pole pieces and energizing coils around the arms of the yoke, a member to bridge the pole pieces, a pivoted lever upon which said member is carried, and a bolt engaging roller also carried by the lever, said housing having an opening therein through which a bolt head may be moved into position for engagement by the roller.

4. An automatic holding and release mechanism including a housing, an electromagnet mounted within the housing including a yoke portion presenting pole pieces and energizing coils around the arms of the yoke, a member to bridge the pole pieces, a pivoted lever upon which said member is carried, a bolt engaging roller also carried by the lever, said housing having an opening therein through which a bolt head may be moved into position for engagement by the roller, an insulating block mounted under the magnet yoke and terminal connector means on said block through which the magnet may be connected to a source of electrical energy.

5. An automatic holding and release mechanism including a housing, an electromagnet mounted within the housing including a yoke portion presenting pole pieces and energizing coils around the arms of the yoke, a member to bridge the pole pieces, a pivoted lever upon which said member is carried, a bolt engaging roller also carried by the lever, said housing having an opening therein through which a bolt head may be moved into position for engagement by the roller, an insulating block mounted under the magnet yoke, terminal connector means on said block through which the magnet may be connected to a source of electrical energy, and a testing switch likewise mounted on said block including a pair of contact elements and a push button guided in the casing for separating said contact elements.

6. An automatic holding and release mechanism including a casing comprising an anchor plate and a box secured to the anchor plate, a pair of projections arranged one above the other on the anchor plate, a horizontal plate adapted to form part of a magnet yoke and fixedly secured to the lower projection, a lever pivoted to the upper projection, a bolt engaging roller carried by the free end of the lever, pole pieces rising from the yoke plate and a cross bar carried by the intermediate portion of the lever for bridging the pole pieces, said box having an opening therein through which a bolt is movable into latched engagement with the roller.

7. An automatic holding and release mechanism including a casing comprising an anchor plate and a box secured to the anchor plate, a pair of projections arranged one above the other on the anchor plate, a horizontal plate adapted to form part of a magnet yoke and fixedly secured to one of said projections, a lever pivoted to the other projection, a bolt engaging keeper carried by the free end of the lever, pole pieces rising from the yoke plate on opposite sides of said lever, and a cross bar carried by the intermediate portion of the lever for bridging the pole pieces, said box having an opening therein through which a bolt is movable into latched engagement with said keeper.

8. An automatic holding and release mechanism including a casing comprising an anchor plate and a box secured to the anchor plate, a pair of projections arranged one above the other on the anchor plate, a horizontal plate adapted to form part of a magnet yoke and fixedly secured to the lower projection, a lever pivoted to the upper projection, a bolt engaging roller carried by the free end of the lever, pole pieces rising from the yoke plate and a cross bar carried by the intermediate portion of the lever for bridging the pole pieces, said box having an opening therein through which a bolt is movable into latched engagement with the roller, coils encircling the pole pieces, and means carried by but insulated from the magnet yoke for establishing electrical connections through the coils.

9. An automatic holding and release mechanism including a casing comprising an anchor plate and a box secured to the anchor plate, a pair of projections arranged one above the other on the anchor plate, a horizontal plate adapted to form part of a magnet yoke and fixedly secured to the lower projection, a lever pivoted to the upper projection, a bolt engaging roller carried by the free end of the lever, pole pieces rising from the yoke plate and a cross bar carried by the intermediate portion of the lever for bridging the pole pieces, said box having an opening therein through which a bolt is movable into latched engagement with the roller, coils encircling the pole pieces, and means carried by but insulated from the magnet yoke for establishing electrical connections through the coils, and a testing switch also carried by but insulated from the yoke to permit manual interruption of current through the magnet coils.

10. An automatic holding and release mechanism for closures including a substantially horizontal pivoted member, an electro-magnet, an armature carried by said pivoted member and cooperating with said magnet for normally retaining said member in a predetermined position, a keeper on said pivoted member at a section spaced from the pivotal support of said member, and a closure retaining bolt having a conformation for latch engagement with said keeper, when said pivoted member is held in said predetermined position by said electromagnet, said conformation also serving as a cam for displacement of said keeper about said pivotal support to permit movement of the closure, upon failure of current through the electro-magnet.

11. An automatic holding and release mechanism for closures including a housing, an electro-magnet mounted within the housing including a yoke portion, presenting pole pieces, and energizing coils around the arms of said yoke portion, a member bridging said pole pieces, a pivoted lever upon which said member is carried at a section spaced from the pivotal support of said lever, and a bolt engaging keeper, also carried by said lever at a section spaced from said pivotal support, said housing having an opening therein through which a bolt head may be moved into position for latch engagement with said keeper.

12. An automatic holding and release mechanism including a lever, an electro-magnet including a yoke portion presenting pole pieces, and a pair of energizing coils encircling the arms of said yoke portion respectively, and disposed on opposite sides of said lever, an armature bar secured to said lever at a section thereof spaced from the pivotal support of said lever, and extending transversely with respect thereto for magnetic cooperation with said pole pieces, and a keeper carried by said lever at a section thereof spaced from its pivotal support, and adapted to latch with a closure bolt.

13. An automatic holding and release mechanism including a housing, a boss extending inwardly from one of the walls of said housing, a lever pivotally supported at one end to said boss, an electro-magnet presenting a pair of pole pieces on opposite sides of said lever, an armature on said lever spaced from its pivotal support, and extending transversely from opposite sides of said lever for magnetic cooperation with said pole pieces, and a bolt engaging keeper carried at the free end of said lever, said housing having an opening therein, through which a bolt head may be moved into latch engagement with said keeper.

14. An automatic holding and release mechanism including a housing, having an anchor plate forming a wall of said housing, a lever pivotally supported at one end to said anchor plate, and extending substantially horizontal, a pair of magnetic pole pieces supported on said anchor plate, and extending substantially parallel to and on opposite sides of said lever, an armature carried by said lever for magnetic cooperation with said pole pieces, and a bolt engaging keeper at the outer end of said lever, said housing having an opening therein through which a bolt head may be moved into latch engagement with said keeper.

HOWARD V. HARDING.